Dec. 17, 1968 SADAMICHI SOMEDA 3,417,312
CONSTANT OUTPUT VOLTAGE RECTIFYING SYSTEMS
Filed Jan. 10, 1966 5 Sheets-Sheet 1

Inventor
SADAMICHI SOMEDA
By Wenderoth, Lind & Ponack
Attorneys

Inventor
SADAMICH SOMEDA
By Wenderoth, Lind & Ponack
Attorneys

United States Patent Office 3,417,312
Patented Dec. 17, 1968

3,417,312
CONSTANT OUTPUT VOLTAGE RECTIFYING SYSTEMS
Sadamichi Someda, Hirakata-shi, Osaka-fu, Japan, assignor to Matsushita Electric Industrial Co., Ltd., Osaka, Japan
Filed Jan. 10, 1966, Ser. No. 519,764
Claims priority, application Japan, July 30, 1965, 40/46,228
4 Claims. (Cl. 321—18)

ABSTRACT OF THE DISCLOSURE

A constant output voltage rectifying system comprising at least one rectifier having a controlling electrode, said rectifier being triggered through a phase shift circuit. The phase shift circuit comprises a nonlinear resistor, the electric resistance of which varies with a variation in the A.C. source voltage so that the output voltage of said rectifier is kept substantially constant.

---

This invention relates to a rectifying system producing an approximately constant D.C. voltage regardless of any variation in the A.C. supply voltage, and more particularly to a constant output voltage rectifying system having a rectifier with a controlling electrode like a silicon controlled rectifier and a nonlinear resistor.

In the following description, such a rectifier with a controlling electrode, such as a silicon controlled rectifier, will be referred to as an SCR and a rectifying system including such an SCR will be called an SCR rectifying system.

In prior conventional types of constant output voltage rectifying systems including an SCR, the rectified D.C. voltage is compared with a reference voltage and the firing angle of the SCR is controlled so as to balance both the voltages. Such a system makes the rectified output voltage exactly constant, but has a drawback in that it requires a complicated circuit.

An object of this invention is a constant output voltage rectifying system which eliminates the use of the above-mentioned reference voltage.

A further object of this invention is to provide an SCR rectifying system which generates an approximately constant D.C. output voltage regardless of any variation in the A.C. supply voltage by using a nonlinear resistor.

A still further object of this invention is to provide an SCR rectifying system with a condenser input filter, which generates an approximately constant D.C. output voltage regardless of any variation in the A.C. supply voltage.

Another object of this invention is to provide an SCR rectifying system with a choke input filter, which generates an approximately constant D.C. output voltage regardless of any variation in the A.C. supply voltage.

These and other objects will be readily apparent to those skilled in the art from an examination of the following specification and accompanying drawings wherein.

Figure 1:
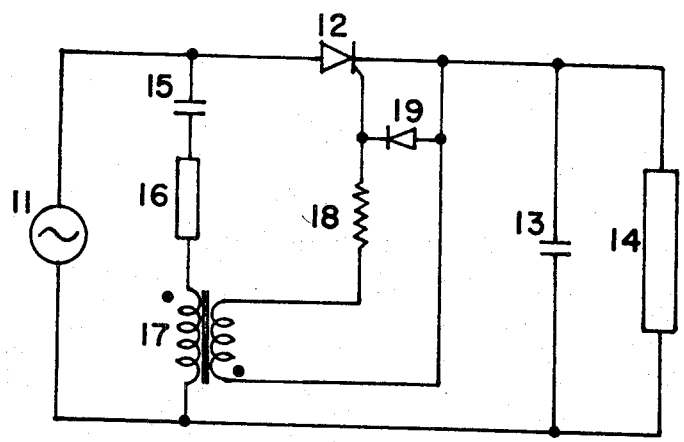
FIG. 1 is a circuit diagram of a constant voltage rectifying system with a condenser input filter in accordance with the invention.

Referring to FIG. 1, an A.C. voltage 11 is applied in one direction across the phase shift circuit comprising a condenser 15 and a resistive circuit 16 and the primary winding of a pulse transformer 17. A pulse appears in the secondary winding of the pulse transformer 17 when the polarity of current flowing through the primary winding is reversed. A firing pulse generated in the secondary winding has a phase which leads by a certain phase angle at each half cycle of A.C. supply voltage dependent upon the design factor of the phase shift circuit. The firing pulse passes through a resistor 18 and then is applied across the gate of SCR 12 and its cathode. Since the AC supply voltage also enters the anode of SCR 12, the SCR is in a closed circuit at each positive half cycle of the AC supply voltage in connection with the above-said firing pulse and as a result a condenser 13 is charged to a value close to the instantaneous value of the supply voltage corresponding at the time of firing of the SCR. An external load 14 is connected in parallel with the condenser 13, and the electric charge of the condenser 13 discharges through the load 14 and consequently the load is provided with the voltage in a wave form as indicated by the thick solid line $i_L$ of FIG. 2.

Figure 2:
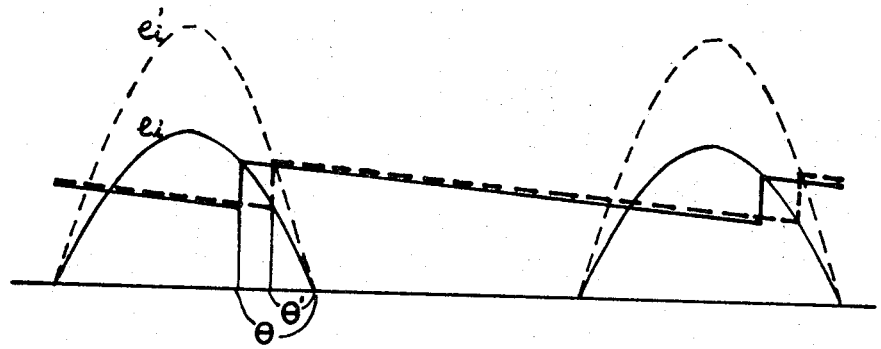
FIG. 2 is a graphical illustration of the waveform of the output voltage generated by the rectifying system shown in FIG. 1.

Referring to FIG. 2, the supply voltage $e_i$, indicated by the thin solid line, produces the output voltage indicated by the thick solid line $i_L$ when the design factor of condenser 15 and resistive circuit 16 in the phase shift circuit is selected in such a manner that the SCR fires at a phase angle of $180°-\theta°$. It is apparent that no variation will occur with regard to a change in the supply voltage from $e_i$ to $e_i'$ if the instantaneous value of the changed supply voltage at the moment of firing of the SCR is the same as that of the original supply voltage $e_i$ at the moment of firing. In order to achieve this, the design of the phase shift circuit is modified so that the SCR fires at a phase angle of $180°-\theta'°$. The output voltage generated by the novel rectifier system with the modified phase shift circuit has a wave form indicated by the thick dotted line $i_L'$ of FIG. 2 and is unchanged at its peak value regardless of any variation in the supply voltage. Accordingly, the average value of the output voltage in a wave form will be constant for a constant load regardless of any variation in the supply voltage.

Figure 3:
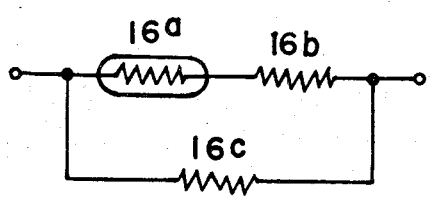
FIG. 3 is a resistance circuit employed in the rectifying system shown in FIG. 1.

In such an arrangement a constant output voltage can thus be produced by controlling the amount of the phase shift dependent upon the variation in the A.C. supply voltage. It has been discovered according to the present invention that a constant voltage rectifying system can be achieved by employing a resistance circuit comprising a nonlinear resistor 16a the electric resistance of which varies with the applied voltage as shown in FIG. 3. Operable resistance circuits are required to satisfy the following characteristics: as among the supply voltage $E_i$, terminal voltage $E_x$ of condenser 15 and terminal voltage $E_R$ of resistive circuit 16 of FIG. 1, the phase of $E_x$ must lag by a phase of 90° behind the phase of $E_R$ and the vector sum of the two must be equal to $E_i$. Such a relationship can be illustrated by the vector diagram in solid lines of FIG. 6. It is clear that the phase of the terminal voltage of the resistive circuit 16 leads the supply voltage by a phase angle of $\theta°$, i.e. the current of primary winding of pulse transformer leads the supply voltage by $\theta°$. FIG. 2, on the other hand, indicates that the following equations apply when peak values of D.C. output voltages are $E_{op}$ and $E_{op}'$ and the firing phase angles are $180°-\theta°$ and $180°-\theta'°$ for effective values of supply voltages of $E_i$ and $E_i'$, respectively:

$$E_{op} = \sqrt{2} E_i \sin \theta \qquad (1)$$

$$E_{op}' = \sqrt{2} E_i' \sin \theta' \qquad (2)$$

In order that there be no variation in the load voltage with a variation in the supply voltage, the following relationship is required:

$$E_{op} = E_{op}' \qquad (3)$$

Combining Equations 1 and 2

$$E_i \sin \theta = E_i' \sin \theta' \qquad (4)$$

Figure 6:
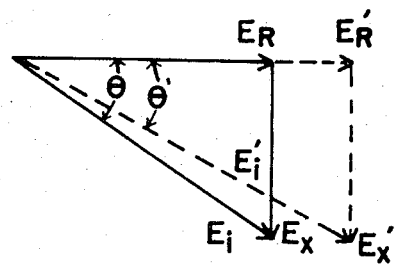
FIG. 6 is a vector diagram showing the relationship among the voltages of various parts of the system of FIG. 1.

On the other hand, FIG. 6 indicates that the following equations hold true:

$$E_i \sin \theta = E_x \qquad (5)$$

$$E_i' \sin \theta' = E_x' \qquad (6)$$

finally one can obtain:

$$E_x = E_x' = \text{constant} \qquad (7)$$

Figure 4:
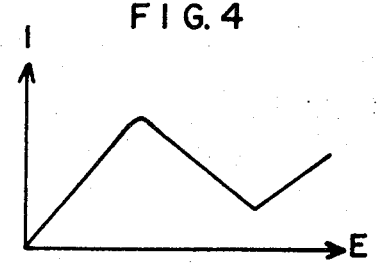
FIG. 4 is a graphical illustration of the voltage-current characteristics of a nonlinear resistor employed in the resistance circuit of FIG. 3.
Figure 5:
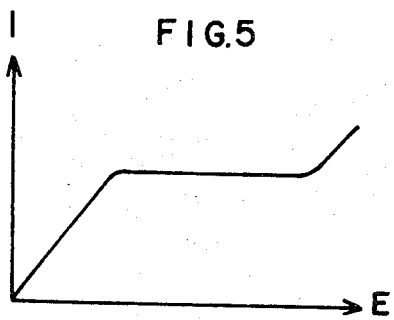
FIG. 5 is a graphical illustration of the voltage-current characteristics of the resistance circuit shown in FIG. 3.

It will be obvious from these equations that the D.C. output voltage can be kept constant if the terminal voltage $E_x$ of condenser 15 of FIG. 1 is constant independent of the supply voltage $E_i$. A constant output voltage can be readily generated where the current flowing through the resistive circuit 16 is made constant independent of the supply voltage. Therefore, it is necessary that the resistive circuit 16 have the voltage-current characteristics as shown in FIG. 5 and its design is selected in such a manner that the operating points of the resistance circuit are located at the flat portions of the voltage-current characteristic curve in FIG. 5. Such a voltage-current characteristic curve can be obtained by employing a nonlinear resistor 16a shown in FIG. 3 which has a characteristic voltage-current curve as illustrated in FIG. 4. For example, a self-heating type of thermistor having a positive temperature co-efficient of electric resistance can be used as a resistor element to produce the required characteristic curve.

In the constant output voltage rectifying system shown in FIG. 1, a pulse generated in the secondary winding of pulse transformer 17 is applied in the negative direction across the gate of the SCR and its cathode when the supply voltage is in a negative half cycle. Since the reverse break down voltage between the gate of the SCR and its cathode generally is not high, a diode 19 is provided to absorb the excessive voltage of the pulse.

Figure 7:
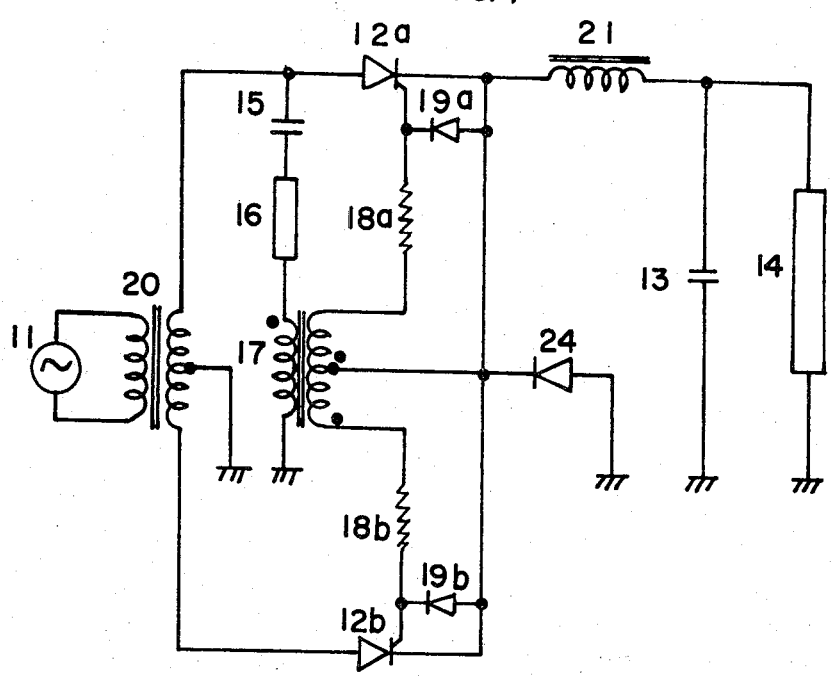
FIG. 7 is a circuit diagram of a constant output voltage rectifying system with a choke input filter in accordance with the invention.

Referring to FIG. 7 showing a single phase full wave rectifying system having a choke input type filter, an A.C. supply voltage 11 is applied across a transformer 20 and is full wave rectified by controlled rectifiers 12a and 12b. The rectified voltage is filtered by a choke 21 and a condenser 13 and finally is supplied to a load 14. On the other hand, the supply voltage is applied to a phase shift circuit comprising a condenser 15 and a resistive circuit 16 through the transformer 20 and then to the primary winding of pulse transformer 17. The pulse generated at the two secondary windings alternately causes firing of SCR 12a and SCR 12b at each half cycle of the supply voltage. Since the current flowing through the choke coil 21 does not vary extensively with time, a rectifier 24 is inserted adjacent to the choke coil 21 and connected to ground in order to supply a load current through the choke coil 21 during the period the SCR is in a non-conducting state. The necessary conditions for a constant voltage rectifying system can be understood in connection with the vector diagram of FIG. 9.

The average output voltage of a rectifier is approximately equal to an average output voltage of a rectifying system having a choke input type of filter. Accordingly, the output voltage $E_o$ can be represented by the following equation where the effective value of the A.C. supply voltage is $E_i$ and the firing angle of the SCR is $180°-\theta°$:

$$E_o = \frac{\sqrt{2}}{\pi} E_i (1 - \cos \theta) \qquad (8)$$

Similarly the output voltage $E_o'$ can be expressed as follows where the effective value of A.C. supply voltage is $E_i' = E_i + \Delta E_i$, and the firing angle of the SCR is $180° - \theta'°$:

$$E_o' = \frac{\sqrt{2}}{\pi} (E_i + \Delta E_i)(1 - \cos \theta') \qquad (9)$$

Figure 9:
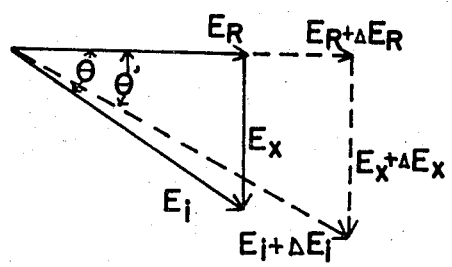
FIG. 9 is a vector diagram of voltages of various components of the rectifying system of FIG. 7.

On the other hand, the vector diagram of FIG. 9 indicates the following relationships:

$$\cos \theta = E_R / E_i \qquad (10)$$

$$\cos \theta' = (E_R + \Delta E_R) / (E_i + \Delta E_i) \qquad (11)$$

By combining these equations with the Equations 8 and 9, respectively the following equations can be written:

$$E_o = \frac{\sqrt{2}}{\pi} E_i \left(1 - \frac{E_R}{E_i}\right) = \frac{\sqrt{2}}{\pi} (E_i - E_R) \qquad (12)$$

$$E_o' = \frac{\sqrt{2}}{\pi} [(E_i + \Delta E_i) - (E_R + \Delta E_R)] \qquad (13)$$

Equations 12 and 13 can be resolved into the following Equation 14 by considering that $E_o$ should be the same as $E_o'$:

$$\Delta E_R = \Delta E_i \qquad (14)$$

From Fig. 9, one can obtain the relationship:

$$(E_i + \Delta E_i)^2 = (E_R + \Delta E_R)^2 + (E_x + \Delta E_x)^2 \qquad (15)$$

$$E_i^2 = E_R^2 + E_x^2 \qquad (16)$$

By subtracting Equation 16 from Equation 15 and neglecting secondary infinitesimal terms:

$$E_i \cdot \Delta E_i = E_R \cdot \Delta E_R + E_x \cdot \Delta E_x \qquad (17)$$

Accordingly, one can obtain the relationship:

$$\frac{\Delta E_i}{\Delta E_R} = \frac{E_R}{E_i} + \frac{E_x}{E_i} \frac{\Delta E_x}{\Delta E_R} \qquad (18)$$

Furthermore, one can obtain the following equation if the supply voltage $E_i$ changes slightly to $E_i + \Delta E_i$:

$$\Delta E_x / \Delta E_R = X / r \qquad (19)$$

where X is the reactance of condenser 15; r is the dynamic resistance of resistive circuit 16 for the slight change in supply voltage; R is the static resistance of resistive circuit 16; and $\Delta E_x$ and $\Delta E_R$ are slight increments of terminal voltages of condenser 15 and resistive circuit 16, respectively. By inserting the Equation 19 into the Equation 18:

$$\frac{\Delta E_i}{\Delta E_R} = \frac{E_R}{E_i} + \frac{E_x}{E_i}\frac{X}{r}$$

$$= \frac{R}{\sqrt{R^2+X^2}} + \frac{X}{\sqrt{R^2+X^2}}\frac{X}{r} \quad (20)$$

Equation 20 can be solved by combining it with Equation 14:

$$r = R[1+\sqrt{1+(X/R)^2}]$$

$$= R(1+\sqrt{1+\tan^2\theta}) = R(1+\sec\theta) \quad (21)$$

Finally one can get:

$$r/R = 1+\sec\theta \quad (22)$$

Accordingly, it will be obvious that a constant output voltage is obtained regardless of any variation in the supply voltage by employing a resistive circuit 16 wherein the static resistance R and dynamic resistance r satisfy Equation 22 at its operating point, X.

Figure 8:
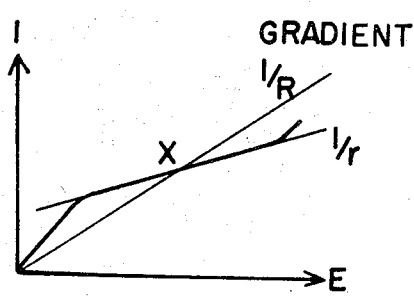
FIG. 8 is a graphical illustration of the voltage-current characteristics of a resistance circuit for the rectifying system of FIG. 7.

Such a resistance circuit can be prepared by using a self-heating type of thermistor 16a which has a positive temperature coefficient of electric resistance as shown in FIG. 4. Referring to FIG. 8 showing a characteristic voltage-current curve for the resistance circuit at a moment when the actual supply voltage is at a center point of its variation, the operating point can be determined at the center point of the straight line of the characteristic curve and a design can be selected for the resistance circuit that the ratio of static resistance R to dynamic resistance r satisfies Equation 22.

Figure 10:
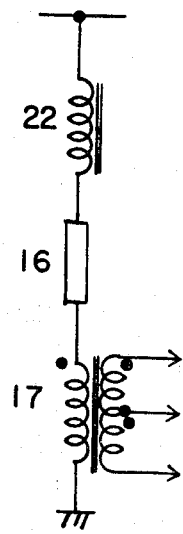
FIG. 10 is a circuit diagram of a phase shift circuit for use in the rectifying system of FIG. 7.
Figure 12:
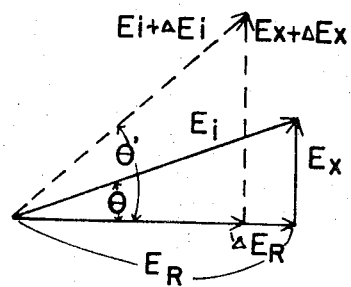
FIG. 12 is a vector diagram showing the relationship among the voltages of the various components of the rectifying system employing the phase shift circuit of FIG. 10.

FIG. 10 shows another phase shift circuit which can be used with the rectifying system of FIG. 7. A choke coil 22 is used as a reactance element in place of the condenser 15 of FIG. 7. The relationship shown by the vector diagram of FIG. 12 is for the terminal voltage $E_x$ of choke coil and the supply voltage $E_i$. The necessary conditions for obtaining a constant output voltage can be determined in a manner similar to the description set forth above in connection with the vector diagram of FIG. 12. The output voltage $E_o$ can be represented by the following equation when the effective value of supply voltage is $E_i$ and the firing angle of the SCR is $\theta°$:

$$E_o = \frac{\sqrt{2}}{\pi} E_i(1+\cos\theta) \quad (23)$$

For an effective value of the supply voltage of $E_i+\Delta E_i$ and a firing angle of $\theta'°$ for the SCR, the output voltage $E_o'$ becomes:

$$E_o' = \frac{\sqrt{2}}{\pi}(E_i+\Delta E_i)(1+\cos\theta') \quad (24)$$

From the vector diagram of FIG. 12 the following relationships can be determined:

$$\cos\theta = E_R/E_i \quad (25)$$

$$\cos\theta' = (E_R+\Delta E_R)/(E_i+\Delta E_i) \quad (26)$$

By putting Equations 25 and 26 into Equations 23 and 24, respectively, and considering that $E_o=E_o'$, one obtains:

$$\Delta E_R = -\Delta E_i \quad (27)$$

Since Equation 20 applies in this case, the following equation can be obtained by combining Equation 20 with Equation 27:

$$r/R = 1-\sec\theta \quad (28)$$

Figure 11:
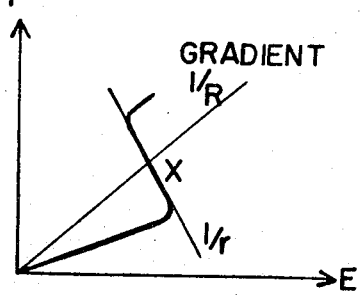
FIG. 11 is a graphical illustration of the voltage-current characteristics of a resistance circuit for use in the phase shift circuit of FIG. 10.

Equation 28 is the relationship necessary to obtain a constant output voltage regardless of a variation in the supply voltage. Therefore, the characteristic curve of the resistance circuit must be as represented in FIG. 11 and the operating point X is the center point of a straight line. It is necessary for a constant output voltage that the Equation 28 be satisfied by a static resistance R and dynamic resistance r at the point X. This requirement can be met by employing a self-heating thermistor having a negative temperature coefficient of electrical resistance as the resistor 16a in FIG. 3.

Figure 13:
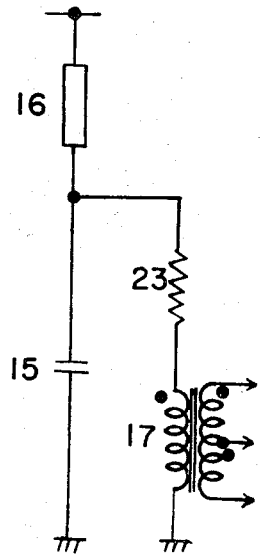
FIG. 13 is a circuit diagram of another phase shift circuit for use in the rectifying system of FIG. 7.
Figure 14:
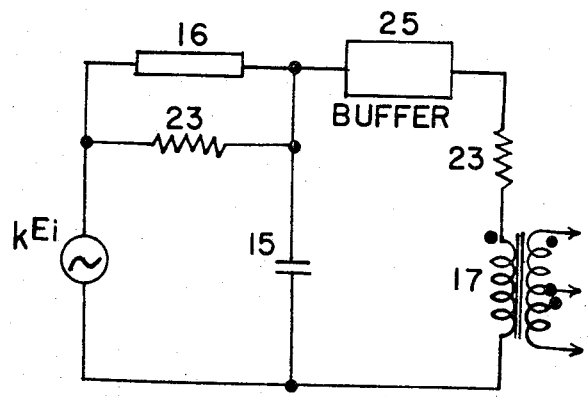
FIG. 14 is a circuit diagram of an equivalent circuit to the phase shift circuit of FIG. 13.
Figure 15:
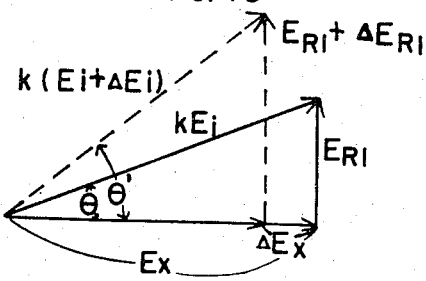
FIG. 15 is a vector diagram showing the relationship among the voltages of the various components of the rectifying system employing the phase shift circuit shown in FIG. 13.

Referring to FIG. 13 showing another phase shift circuit which can be used to obtain a constant output voltage from the system of FIG. 7, an ordinary resistor 23 in series with the primary winding of the pulse transformer 17 is connected in parallel with a condenser 15 for the purpose of obtaining an action similar to that of the circuit of FIG. 10. A value $k$ can be defined as follows:

$$k = R_{23}/(R_{16}+R_{23})$$

where $R_{16}$ and $R_{23}$ are the resistances of a resistive circuit 16 and the ordinary resistor 23, respectively. When the supply voltage is $E_i$, the equivalent circuit of the circuit of FIG. 13 can be represented by the circuit of FIG. 14 wherein a buffer circuit 25 has an infinite input impedance, an infinitestimal output impedance and unity voltage gain. FIG. 14 clearly indicates that a current flowing through the primary winding of pulse transformer 17 is the same phase as that of the terminal voltage of condenser 15. By providing a parallel circuit having an ordinary resistor 23 and the resistive circuit 16 as a single new resistance circuit having a terminal voltage of $E_{R1}$, one can obtain a vector diagram as shown in FIG. 15. The relationship necessary for obtaining a constant output voltage with such an arrangement can be deduced in a manner similar to that described above.

FIG. 15 indicates that the following equations, in which designations similar to that of the preceding disclosure have been used, will hold true:

$$\cos\theta = E_x/kE_i \quad (29)$$

$$\cos\theta' = (E_x+\Delta E_x)/k(E_i+\Delta E_i) \quad (30)$$

Putting these equations into Equations 23 and 24 and considering $E_o=E_o'$, one obtains the equation:

$$\Delta E_x = -k\cdot\Delta E_i \quad (31)$$

On the other hand, a similar resolution of the Equation 17 results in the equation:

$$\frac{k\cdot\Delta E_i}{\Delta E_x} = \frac{E_{R1}}{kE_i}\frac{\Delta E_{R1}}{\Delta E_x} + \frac{E_x}{kE_i}$$

$$= \frac{R}{\sqrt{R^2+X^2}}\frac{r}{x} + \frac{X}{\sqrt{R^2+X^2}} \quad (32)$$

Combining Equation 31 with Equation 32, $$r = -\frac{X}{R}(\sqrt{R^2+X^2}+X)$$

$$= -R\cot\theta\,(\operatorname{cosec}\theta+\cot\theta) \quad (33)$$

Finally one obtains $$r/R = -\cot\theta\,(\operatorname{cosec}\theta+\cot\theta \quad (34)$$

It will be obvious that a constant output voltage is generated by the arrangement which has a resistive circuit 16 with a resistor 23 as shown in FIG. 13 when the static resistance R and the dynamic resistance r of the resistance circuit satisfy Equation 34. It is preferable to employ a resistance circuit comprising a self-heating type of thermistor have a negative temperature coefficient of electrical resistance.

A specific embodiment of this invention is illustrated in the following example. However, this example should not be construed as limitative.

In connection with FIG. 1, the elements have the following specified values:

| | |
|---|---|
| SCR 12 | CR3D-6. |
| Condenser 13 | 50 microfarads. |
| Load resistance 14 | 750 ohms. |
| Condenser 15 | 0.25 microfarad. |
| Resistive circuit 16 | A self-heating type of Thermistor, PTH 82D102M having a positive temperature coefficient of electric resistance (Murata Manufacturing Co., Japan) connected in parallel with an ordinary resistor of 27K ohms. |
| Resistor 18 | 1K ohm. |
| Diode 19 | OA95. |

Figure 16:
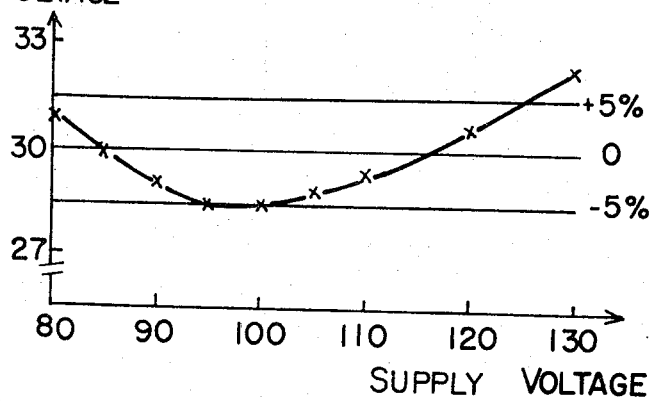
FIG. 16 is a graphical illustration of the relation between the output voltage and the supply voltage of an embodiment of this invention.

It will be readily understood from FIG. 16 that the specified rectifying system can generate a D.C. output voltage of 30 v.±5% where the A.C. supply voltage is 100 v.±20% in accordance with the present invention.

Obviously many modifications and variations of the present invention are possible in the light of the above teachings. It is therefore to be understood that within the scope of the appended claims the invention may be practiced otherwise than as specifically described.

What is claimed is:

1. A constant output voltage rectifying system comprising at least one rectifier having a controlling electrode, an anode and a cathode; said at least one rectifier having on the output side only a filter means having an input side coupled to the anode-cathode path of said rectifier so as to be coupled to the A.C. voltage source, said filter including a choke coil in series with said rectifier and said filter having an output side adapted to be coupled to a load; a phase shift circuit comprising a series circuit of a condenser and a resistance circuit including a non-linear resistance and adapted to be coupled to said A.C. voltage source, said resistance circuit having said non-linear resistor therein having the elements with values giving to said circuit a characteristic having the relationship $r/R = 1 + \sec \theta$, wherein R and r are the static and dynamic resistance of said resistance circuit, respectively, and the firing angle of said rectifier is $180° - \theta$; a pulse transformer having a primary winding coupled to said phase shift circuit, said coupled phase shift circuit and primary winding being adapted to be coupled to the A.C. voltage source, and said pulse transformer having at least one secondary winding coupled in a series circuit with the controlling eelctrode and cathode of said rectifier; said non-linear resistor being thermally isolated from the other elements of the circuit and independent of the ambient temperature and the resistance varying with a change of the voltage across the said non-linear resistor, whereby the voltage across said load is substantially constant regardless of a variation in said A.C. voltage.

2. A constant output voltage rectifying system comprising at least one rectifier having a controlling electrode, an anode and a cathode; said at least one rectifier having on the output side only a filter means having an input side coupled to the anode-cathode path of said rectifier so as to be coupled to the A.C. voltage source, said filter means including a first choke coil in series with said rectifier, and said filter having an output side adapted to be coupled to a load; a phase shift circuit comprising a series circuit of a second choke coil and a resistance circuit including a non-linear resistance adapted to be coupled to said A.C. voltage source, said resistance circuit having said non-linear resistor therein having elements with values giving to said circuit a characteristic having the relationship $r/R = 1 - \sec \theta$, where R and r are the static and dynamic resistance of said resistance circuit, respectively, and $\theta$ is the firing angle of said rectifier; a pulse transformer having a primary winding coupled to said phase shift circuit, said coupled phase shift circuit and primary winding being adapted to be coupled to the A.C. voltage source, and said pulse transformer having at least one secondary winding coupled in a series circuit with the controlling electrode and cathode of said rectifier; said non-linear resistor being thermally isolated from the other elements of the circuit and independent of the ambient temperature and the resistance varying with a change of the voltage across the said non-linear resistor, whereby the voltage across said load is substantially constant regardless of a variation in said A.C. voltage.

3. A constant output voltage rectifying system comprising at least one rectifier having a controlling electrode, an anode and a cathode; said at least one rectifier having on the output side only a filter means having an input side coupled to the anode-cathode path of said rectifier so as to be coupled to the A.C. voltage source and an output side adapted to be coupled to a load; a phase shift circuit comprising a series circuit of a condenser and a resistance circuit including a non-linear resistance and adapted to be coupled to said A.C. voltage source; a pulse transformer having a primary winding coupled to said phase shift circuit and a further resistance and said condenser being connected in parallel with the primary winding of said pulse transformer, and said pulse transformer having at least one secondary winding coupled in a series circuit with the controlling electrode and cathode of said rectifier; said non-linear resistor being thermally isolated from the other elements of the circuit and independent of the ambient temperature and having a resistance varying with a change of the voltage across the said non-linear resistor so that the voltage across said load is substantially constant regardless of a variation in said A.C. voltage.

4. A rectifying system as claimed in claim 3 in which said filter means includes a choke coil in series with said rectifier, said resistance circuit having resistive elements therein with values giving to said circuit a characteristic having the relationship $r/R = \cot \theta \, (\csc \theta + \cot \theta)$ where R and r are the static and dynamic resistance of said resistance circuit, respectively and $\theta$ is the firing angle of the rectifier.

References Cited

UNITED STATES PATENTS

| | | | |
|---|---|---|---|
| 3,160,806 | 12/1964 | McDaniel et al. | 321—16 XR |
| 3,176,212 | 3/1965 | De Puy | 321—18 XR |
| 3,207,975 | 9/1965 | Pintell | 321—16 XR |
| 3,281,638 | 10/1966 | Crawford | 321—16 XR |
| 3,299,340 | 1/1967 | Deelman | 321—18 |
| 3,300,704 | 1/1967 | McMillan | 321—18 XR |
| 3,323,034 | 5/1967 | Dubin et al. | 321—16 |
| 3,337,792 | 8/1967 | Engelson | 323—22 |

JOHN F. COUCH, *Primary Examiner.*

W. M. SHOOP, *Assistant Examiner.*

U.S. Cl. X.R.

323—22, 36; 321—47